Nov. 22, 1938.  J. G. KERSHAW  2,137,774
SINGLE PROCESS SCUTCHER OR PICKER WITH HOPPER FEEDER
Original Filed Aug. 3, 1934     7 Sheets-Sheet 1

Nov. 22, 1938.  J. G. KERSHAW  2,137,774
SINGLE PROCESS SCUTCHER OR PICKER WITH HOPPER FEEDER
Original Filed Aug. 3, 1934  7 Sheets-Sheet 2

Nov. 22, 1938.   J. G. KERSHAW   2,137,774
SINGLE PROCESS SCUTCHER OR PICKER WITH HOPPER FEEDER
Original Filed Aug. 3, 1934   7 Sheets-Sheet 3

INVENTOR
John Green Kershaw
BY E. J. Fetherstonhaugh
ATTORNEY

Nov. 22, 1938.   J. G. KERSHAW   2,137,774
SINGLE PROCESS SCUTCHER OR PICKER WITH HOPPER FEEDER
Original Filed Aug. 3, 1934   7 Sheets-Sheet 7

INVENTOR
John Green Kershaw
By E. J. Fetherstonhaugh
ATTORNEY

Patented Nov. 22, 1938

2,137,774

UNITED STATES PATENT OFFICE 2,137,774

SINGLE PROCESS SCUTCHER OR PICKER WITH HOPPER FEEDER

John Green Kershaw, Drummondville, Quebec, Canada, assignor to Dominion Textile Company Limited, Montreal, Quebec, Canada Application August 3, 1934, Serial No. 738,282
Renewed May 4, 1938

6 Claims. (Cl. 19—68)

The invention relates to a scutching or picking machine with lap forming device and hopper feeding machine, known as a single process scutcher or picker, as described in the present specification and illustrated in the accompanying drawings that form part of the same.

The invention consists essentially in automatically controlling the feed through devices affected by the quantities and the densities of these quantities in passage, and in the continuous operation to and through dressing devices and on to the final lap forming rollers and lap, as pointed out in the claims for novelty following a description in detail of the various parts and their operations.

The objects of the invention are to effectively follow the several beating actions by determining the proper quantity and density of the fiber, to be dressed, so that it may readily continue and be disentangled in prepartion for the final beating or dressing ready for the lap forming members; to shorten up the conventional methods of building up laps of the fibrous material and produce a through connection from the feed to the final lap and thereby materially reduce the cost of handling as well as insure great economy in the matter of elapsed time, in other words very much speed up the manufacture of cotton and other fabrics, in which the fibers require combing and cleaning previous to winding and in this connection it may be mentioned that under present conditions in the cotton trade for example, the scutching is divided into two operations carried out by separate machines, one of which does the rough dressing and the other picking or combing and the sheeting in preparation for the final beating just before completing the final lap and this invention enables the manufacturer to eliminate the break in the process and carry through to the final lap in the one run, which is a great advantage in itself, though the parts which permit this through passage may also benefit the double operation.

Further objects of the invention are to reduce the original cost of the plant in these manufactures and the subsequent repairs that are always more costly where the operations are not continuous, and generally to reduce the cost of production of cottons and such like for the benefit of the manufacturer and consequently in turn for the benefit of the public and not only maintain but materially increase the efficiency in both manufacture and the result, in so far as the article is concerned.

In the drawings.

Like numerals of reference indicate corresponding parts in the various figures.

Referring to the drawings, following the breaking of the bales and rough cleaning, the stock reaches the carrier or carriers indicated by the numeral 15, and it is on to this carrier mechanism that the stock or cotton, as it will be generally called in this description, for convenience's sake, will be transported and this cotton, which has been roughly cleaned, feeds on to the carrier 16 and is elevated by the carrier 17 to the delivery section of the hopper feeding machine.

The beater 19 is formed with a hub mounted on the driven shaft 20, and from which the blades 21 project radially and extend across the machine. The beater 19 is at the mouth of the delivery section 18, and its blades strip the cotton from the carrier apron 17 and propel it forward into the delivery section. The dust, dirt, leaf, sticks and other extraneous matter fall to the ground. This carrier being rearwardly inclined from the vertical, the teeth 22 lift the cotton up on the leaning face and carry it to the beater 19 which is practically at the mouth of the delivery section.

This mechanism so far as it has been described is conventional construction and the novel features begin with the passage of the cotton into the delivery section. Naturally the rotation of the blades in a downward direction strips the cotton from the spikes of the apron carrier 17, driving it into the mouth of the delivery section, and this partially cleaned cotton continues passing in a mass in so far as the capacity of the delivery section will permit.

The delivery section construction includes a top wall formed of two hinged door sections, the uppermost door constituting a yielding member capable of being pushed outwardly by an increasing mass of cotton which builds up after the delivery section becomes full, tending to choke the throat of the delivery section, and therefore relief must be obtained by hesitation or stoppage of the apron carrier 17. The result of this outward door movement is the temporary cessation of the feed as will be explained more fully hereinafter. This door 23 as a yielding member is pivotally secured in the bearings 24, while the cover door 25 is secured in the pivot bearings 26.

These side walls 27 and 28 are fixed while the bottom wall 29 and the sectional top wall are adjustable and have independent functional movements in controlling the feed of the cotton.

The adjustable bottom wall 29 can be moved in a horizontal direction, backwardly or forwardly in the boxlike structure and is carried on the triangular frame 30 towards and away from the cover door 25, always leaving sufficient space for the cotton to pass, according to the amount desired, which is controlled by the action of the upper hinged door 23. The cover door 25 has a smoothing effect on the cotton when brought into contact with it through the manipulation of the adjustable bottom 29.

Figure 1:
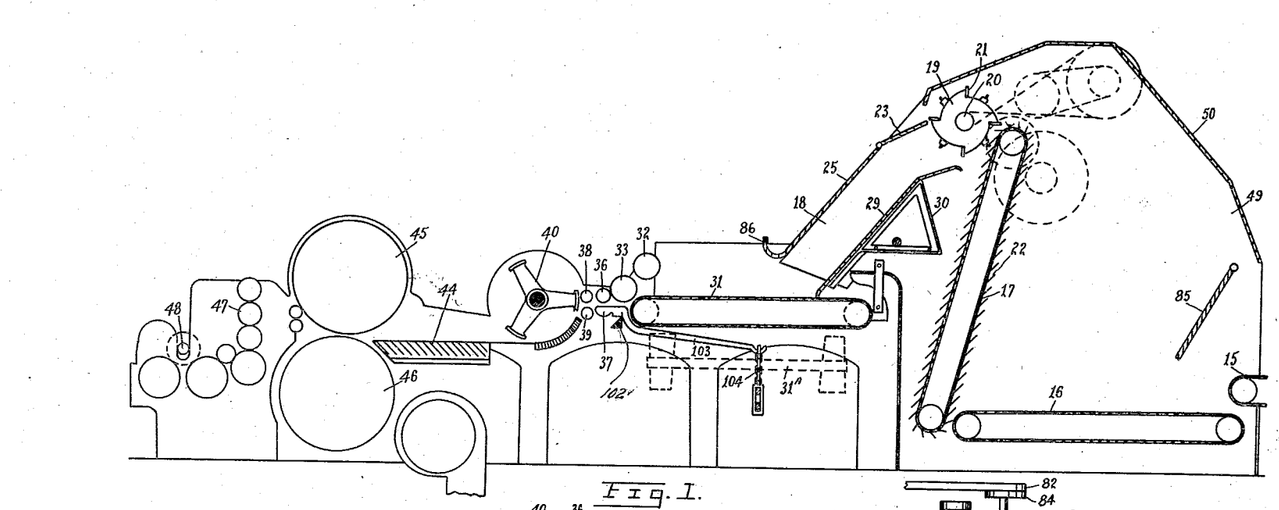
Figure 1 is a longitudinal sectional view of the complete machine showing the parts through which the cotton passes from the beginning of the dressing to the winding of the lap.
Figure 2:
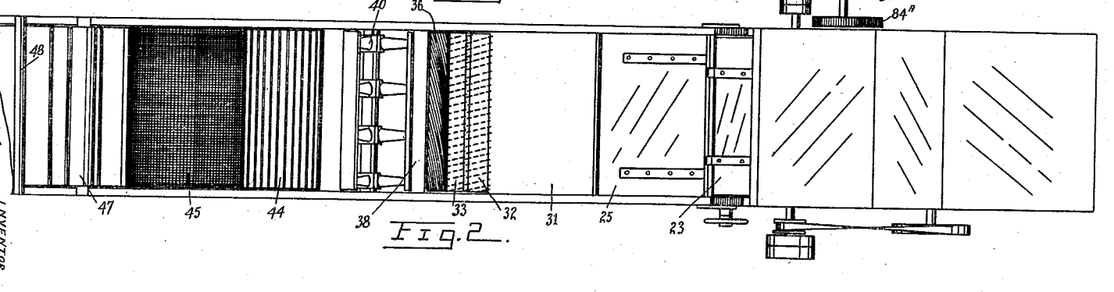
Figure 2 is a plan view of the parts illustrated in Figure 1 with the casing covers removed.
Figures 3, 5:
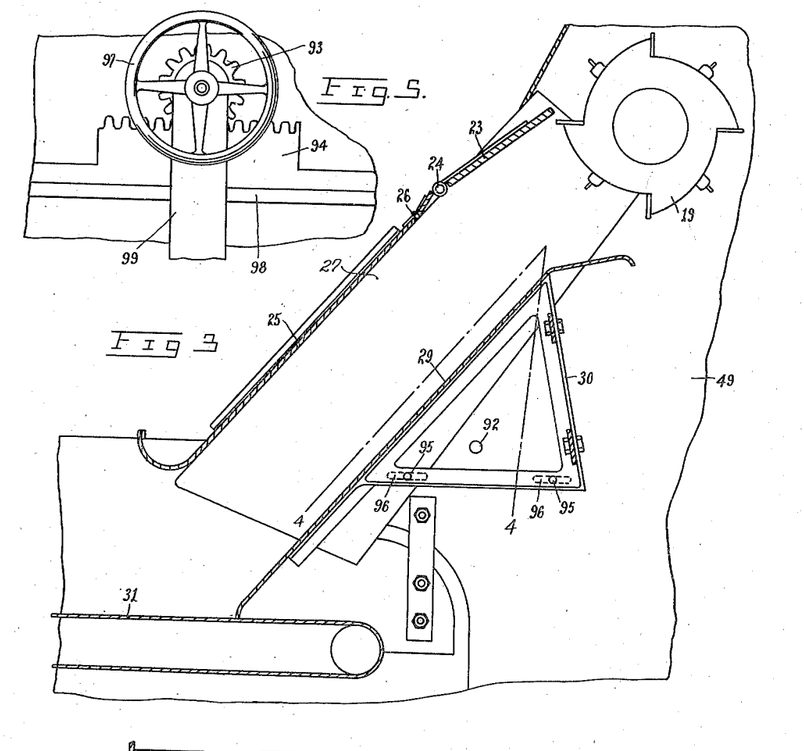
Figure 3 is a vertical sectional view of the delivery section and beater of the hopper feeder, showing the adjustable bottom of the delivery section.
Figure 5 is a detail showing an enclosed elevational view of the frame showing the manually operated adjustment, mechanism for the adjustable bottom of the delivery section.
Figure 4:
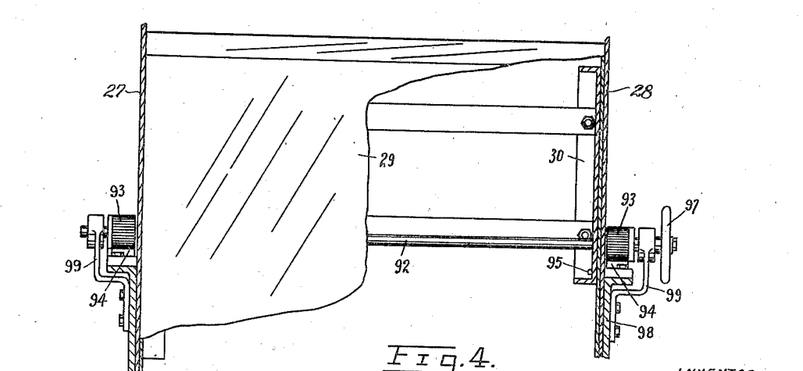
Figure 4 is a cross sectional view on the lines 4—4 in Figure 3, showing the operating parts of the adjustable bottom of the delivery section and the latter broken away to disclose parts there below.
Figure 6:
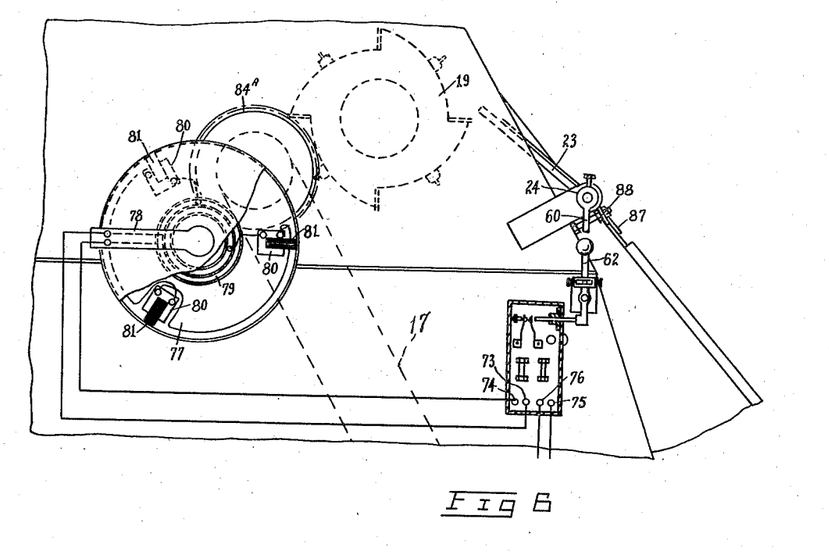
Figure 6 is a fragmentary view of a side wall of the feed hopper casing showing an electromagnetic clutch and electrical connections thereto and the mechanical connections from a yielding member of the top wall of the feed hopper.
Figure 7:
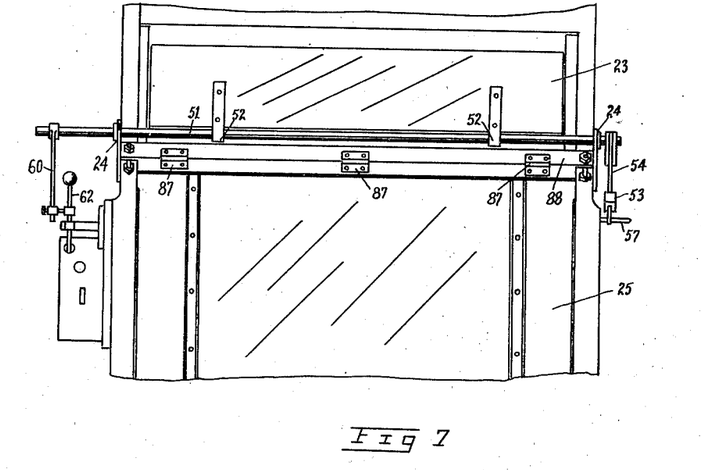
Figure 7 is an elevational view of the top wall of the hopper particularly showing the yielding member or door forming the automatic mechanical operating parts for electro-magnetic clutch and showing the inspection door broken away.
Figure 8:
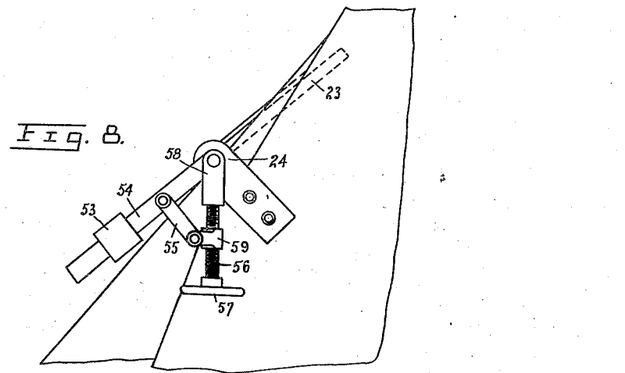
Figure 8 is a detail showing the capacity adjusting mechanism for the clutch operating door.
Figure 9:
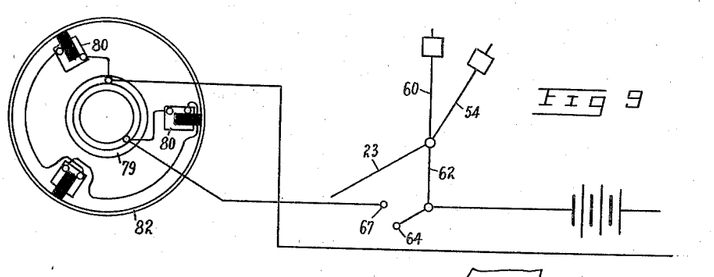
Figure 9 is a diagrammatic view showing the electrical and mechanical moving parts for effecting the operation of the magnetic clutch and showing the switch open.
Figure 10:
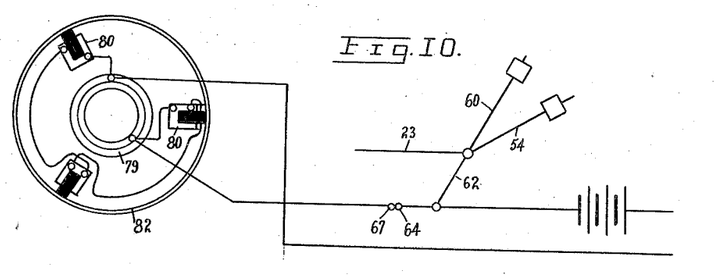
Figure 10 is a diagrammatic view showing the electrical and mechanical moving parts for effecting the operation of the magnetic clutch and showing the switch closed.
Figure 11:
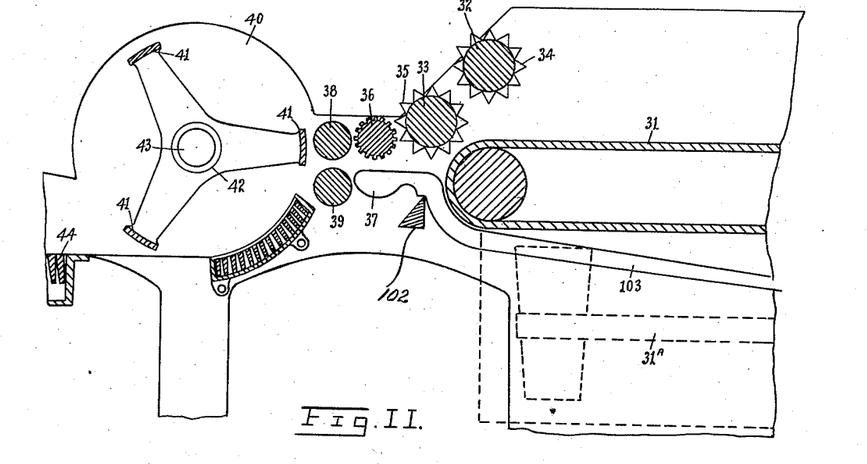
Figure 11 is an enlarged sectional detail showing the feeding, regulating and cleaning section of the scutching or picking machine.
Figure 12:
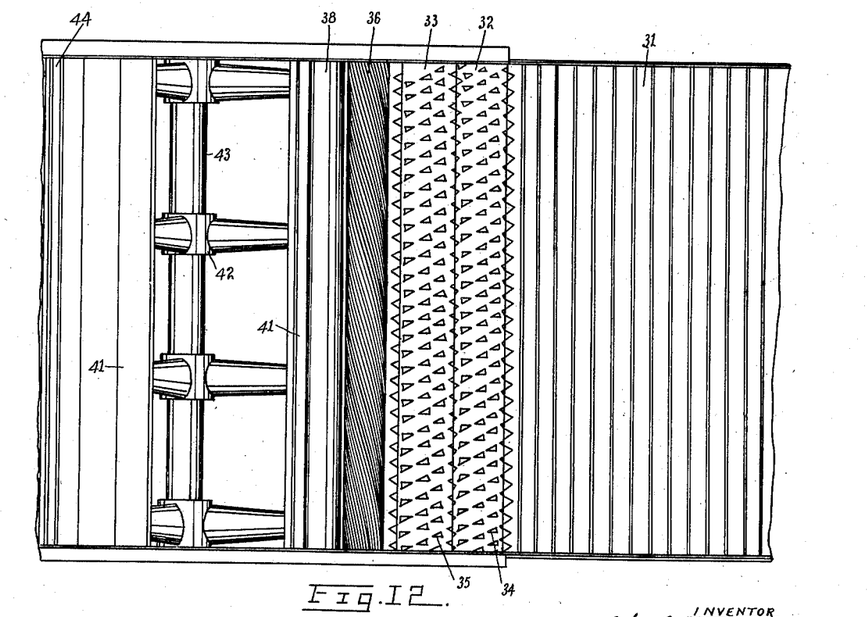
Figure 12 is an enlarged plan view of the same section as illustrated in Figure 11.
Figure 13:
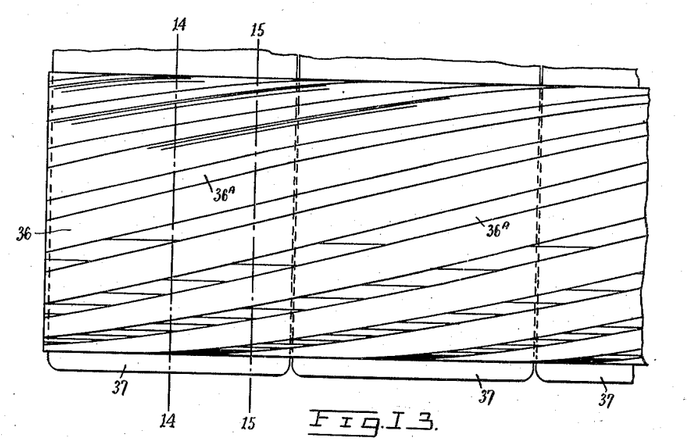
Figure 13 is an enlarged detail showing a fragmentary view of a regulating, feeding and forming roll passing over the pedals.
Figure 14:
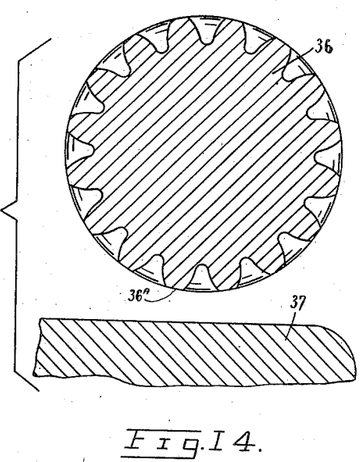
Figure 14 is a cross sectional view on the line 14—14 in Figure 13.
Figure 15:
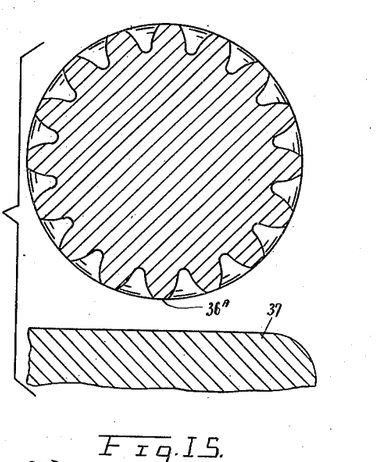
Figure 15 is a cross sectional view on the line 15—15 in Figure 13.
Figure 16:
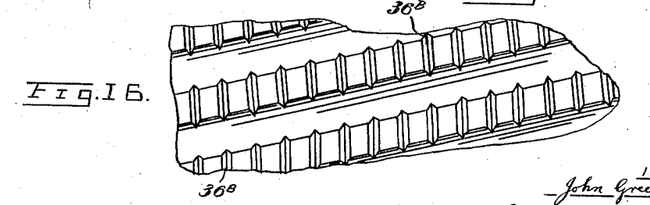
Figure 16 is a detail showing a fragmentary view of the regulating and feeding roll having its teeth slightly in modified form.
Figures 17, 19:
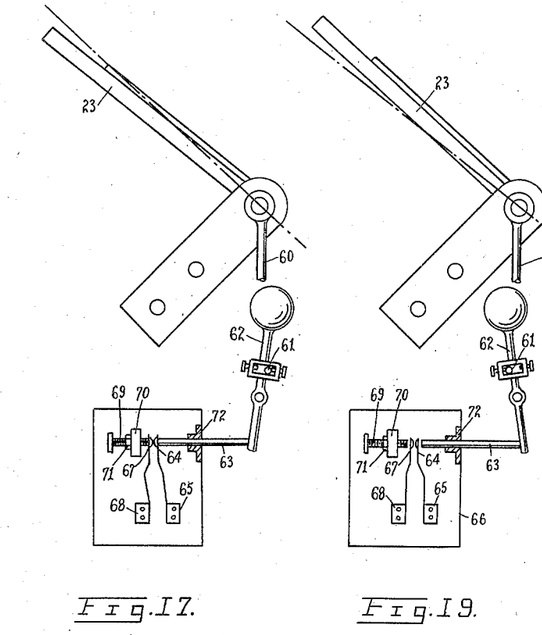
Figure 17 is an elevational detail of the spring contact operating mechanism showing these contacts in their closed position.
Figure 19 is an elevational detail showing the same parts as in Figures 17 and 18 with the contacts open.
Figure 18:
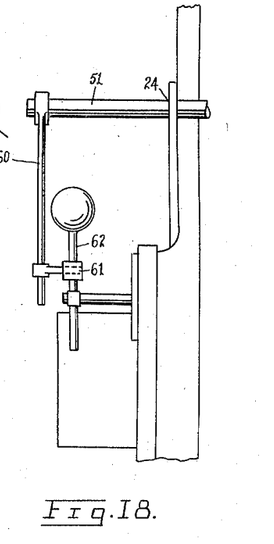
Figure 18 is an elevational view at right angles to Figure 17 showing these contacts in their closed position.
Figure 20:
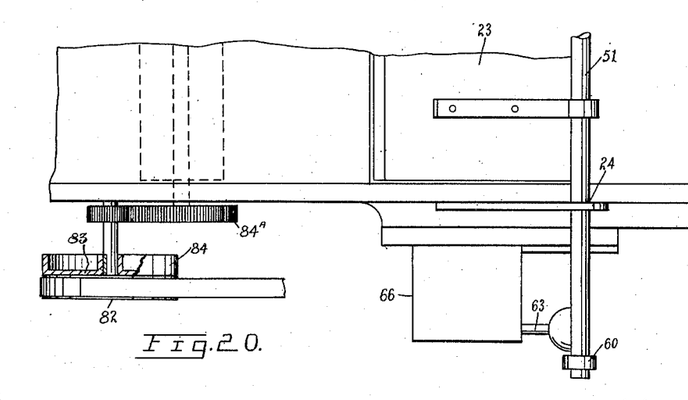
Figure 20 is a plan view of spring contact operating mechanism and feed belt drive.

The delivery section empties the cotton on to a wood slat apron carrier 31 and reaches the collecting rolls 32 and 33. These collecting rolls have rows of spikes 34 and 35 respectively in spiral arrangement. These rolls reduce the mass of cotton to a thickness suitable for passing under the regulating roll 36, when it is pressed against the yielding pedals 37 of the regulating motion. In order to prevent dancing of the pedals, which interferes with good regulation, the flutes of the regulating roll are cut in spiral fashion in such a pitch that two adjoining flutes are in contact with any pedal at the same time, which maintains a continuous engagement and pressure on the cotton sheet in a transverse direction from side to side, in other words, there are no intervals between pressures as under present conditions where all teeth are parallel with the longitudinal axis. The tops of the teeth 36A forming the spiral flats may be corrugated as shown at 36B in Fig. 16. The making of the flutes of the regulating roll in spiral fashion is necessary because of the deep grooving required to collect and feed the dense mass of cotton to the feed rolls, and at the same time preserving an equal number of blows per inch as in a two process system. This spiral fluting of the regulating roll permits smooth contact with the flat surface of the pedals at all times, and does away with the dancing motion of the pedals caused by deep straight grooves parallel with the axis of the roll.

The cotton passes under the regulating roll 36, and any variations in thickness of the cotton causes alterations in the disposition of the pedals 37. Pedal movements collectively control the position of the regulator cone belt 31A and consequently, the speed of the regulating roll 36, which is driven from it. The cotton then passes between the feeding rolls 38 and 39 which project the sheet in its flattened condition into the path of the beater 40. This beater 40 is formed with the blades 41 secured in the hub 42 mounted on a driven shaft 43 and this beater strikes the cotton from the nip of the feed rolls 38 and 39, driving it over grid bars, through which falls dirt, leaf, sand, etc. The cotton is now drawn over grid bars 44 onto wire cages 45 and 46 by suction from a fan, from whence it passes through the calendering rolls 47 to the lap roller 48 on which the lap formed.

The outer casings 49 and top plate 50 are in the nature of cover plates, enclosing the feed end of the machine and extend forwardly as far as the delivery section. The side walls of the outer casing partitions extend throughout the length of the machine, and it is from these side walls that the bearings 24 extend in the form of brackets to support the pivot pins 51 of said door 23. The barrel 52 of the hinge terminates this door at the inner end and is fast on the pin 51, and at one end the balance weight 53 is adjustably mounted on the arm 54, which projects from the pivot pin and is keyed thereto. This arm 54 is connected by the link 55 to the adjusting screw 56, this screw having the operating handle 57 and turning in the clevis block 58 which is pivotally mounted on the end of the pivot pins 51, the link 55 being pivotally secured to the arm at one end and to the nut 59 at the other end, the latter being mounted on said screw for adjusting purposes.

The turning of the screw by means of the handle 57 changes the position of the screw 56 in relation to the arm 54, while the nut remains constant in this relationship, and it will be seen that one position of the nut on the screw will turn the pivot pin and consequently the door 23 to the desired adjusted position.

If the nut is moved towards the wheel or handle, the door 23 is moved outwardly when it will allow a greater mass of cotton to pass into the delivery section before causing the apron carrier 17 to stop. If the nut is moved away from the wheel, the opposite effect is obtained. This adjustment is necessary in order to process different types and grades of fibrous material, or different weights of lap required.

The other end of the pivot pin 51 is connected to the electrically and mechanically operated parts for starting and stopping the feed, and in this connection, the door 23 itself becomes the mechanically operated lever due to the pressure from within the throat of the delivery section tending to push the door outwardly.

The movement of this door outwardly rotates the pivot pin, which in turn operates the arm 60 in the slot 61 of the weighted pivoted lever 62, this lever being swivelly connected with a push pin 63.

The push pin 63 engages the back of the spring switch contact 64 secured through the flange 65 to a baseboard 66, containing the switch mechanism.

The coacting spring contact 67 extends from the flange 68 secured to said base board and the adjustment of this contact 67 is by means of the threaded pin 69 screwing into and through the stop 70 and held by the lock nut 71 in position.

The push pin 63 is shown as sliding in the bracket 72 rigidly secured to said baseboard. The binding posts 73 and 74 are respectively connected to the switch contacts through corresponding binding posts in the switch contact flanges and similarly the leads 75 and 76 to the power are connected to said switch flanges, but the binding posts 73 and 74 are directly connected to the machine clutch 77 through the arm 78, the commutator 79 to the electro-magnetic clutch coils 80 having the clutch cores 81. These electro-magnetic clutch coils 80 are fast within the driven pulley 82 which is a slack pulley and constantly rotated by a driving belt.

The feed to the elevating carrier apron 17 is interrupted through the action of the regulating door 85, and it may be said that this feed to the elevating carrier is independently driven and is quite another mechanism.

The operation of the door 25 is manual, and this door is lifted by the handle 86 projecting from the lower end, and the door only needs to be opened to determine the conditions of the fibrous material within the hopper.

This door is secured by hinges 87 to the cross bar 88.

The lower wall of the delivery section may be termed also the bottom, for the delivery section is on a considerable slant and this lower wall or bottom 29 is a plate or plates supported on the triangular frame 30.

The operating shaft 92 is journalled in the casing 49 and this shaft carries at each end a pinion 93 coacting with the rack 94, this rack having inwardly projecting pins 95 through the elongated slots 96 in the casing 49 and engaging inside said casing the triangular frame 89, which is manually operated inwardly and outwardly between the side walls of the hopper by the hand wheel 97.

The turning of this hand wheel moves the rack, which slides in the bracket 98 from which the posts 99 project upwardly to serve as bearings for said operating shaft 92, and by this means the triangular frame is carried in a way to constrict the throat of the delivery section, as there are several different kinds of cotton fibrous material, all depending in so far as volume and density are concerned on the source of supply.

Briefly, the operation of the machine that has not been already described in connection with the detailed parts, begins at the elevation of the cotton from the feeding mechanism emanating from the room where the cotton bales are broken and where rough cleaning usually occurs.

The elevation of the cotton brings it up into contact with the beater, which is a primary opening machine. The beater strips the cotton from the spikes of the apron carrier, throwing it into the throat of the delivery section. The feed remains constant so long as there is no choking in the mouth or throat of the delivery section, but this choking will occur periodically because it is necessary to feed a small surplus over the actual requirements to make a lap of even weight. When the choking occurs the door 23 is pushed outwardly and cuts off the electrical current to the electro-magnets and to put the elevating feed carrier out of commission.

As soon as the pressure of the cotton on the door 23 is released, the switch contacts 64 and 67 are brought together which energizes the electro-magnets fixed in the pulley 82 which with the cores complete a magnetic circuit with the clutch plate 83 formed in the driven pulley 84, thereby creating a pull between the pulleys 82 and 84 and consequently holding the pulley 84 through a suitable friction face to rotate with the pulley 82 and in turn driving the elevating carrier through the intervening gears 84A.

The belt drives shown in dotted lines not particularly specified, drive the many parts of the machine and are here shown as constantly driving the slack pulley 82. When the electrical current is cut off from the electro-magnets through the action of the door 23, the engagement of the pulley 82 with the pulley 84 through the clutch plate 83 is broken by the subsequent breaking of the magnetic circuit and the pulley 84 consequently stops rotating while the pulley 82 continues to be driven by the belt. The stopping of the pulley 84 instantly stops the drive of the elevating carrier through the connecting gears 84A.

The fibrous material empties out from the delivery section on to a wood slat apron, but previously, the depth of the delivery section has to be adjusted for the different classifications of fibrous material.

The fibrous material emptying on to the wood slat apron operated by the inverted cone driving mechanism, moves on to the collecting rolls, these collecting rolls having spikes or pins in rows spirally arranged from one end to the other and the collecting rolls at this point are followed by the regulating roll, which is quite different in this invention and constitutes spiral fluting in place of axial fluting of the roll.

This is very important for the reason that this fluted roll practically forms a sheet, as the cotton thereunder moves over the many pedals which are balanced on the point bearings 102.

These pedals have the shafts 103 extending rearwardly and terminating on the hook to which the links 104 are attached. These links are connected with the raising and lowering of the belt drive on the inverted cone for the purpose of regulating the supply of cotton to the feed rolls, leading into the finishing beater, and from this beater the cotton proceeds to the cages mentioned hereinbefore, and through to the calendering rolls in the form of a sheet, and this sheet proceeds to the lap roll on which the lap is made, and this lap is made all in a single operation. Of course, some parts may be used that correspond to the present methods of making laps, by interrupted operations but in the preferable way of carrying out this invention, its finished lap is accomplished in the one run, which is the most excellent method, as the laps consist of one layer. The old method is to make opener laps which are not even in formation, four of these laps are placed on a finishing scutcher or picker on which is made the finished lap from two processes. Whereas in this machine the whole process of cleaning, feeding and regulating is successfully done in one operation.

What I claim is:—

1. In a scutching or picker machine, a feed carrier suitably driven and having a start and stop mechanism, means for dressing the material fed in, an encased passage having a movable member operated by excess material for stopping the feed and a delivery sheet frame having a rack and pinion adjustment and carrying the bottom of said encased passage forwardly and rearwardly.

2. In a scutching or picker machine, a feed carrier suitably driven and having a start and stop mechanism, means for dressing the material fed in, an encased passage having a movable member operated by excess material for stopping the feed, collecting rolls having spiral rows of spikes, a regulating roll having spiral flutings, pedals mounted thereunder, a dressing device and lap forming mechanism.

3. In a scutching or picking machine, a plurality of belt carriers leading to a delivery section and transporting raw cotton to lapping devices, a delivery section having an adjustable neck and a regulating yielding member automatically connected to the carrier mechanism aforesaid and controlling the feed to the delivery section, a slat carrier and spiked rollers collecting the cotton, a spirally fluted roller smoothing the cotton, change speed levers cooperating with said fluted roller in regulating the speed of travel of the cotton in forming a lap, and a lap roller automatically rising as the bolt of the lap rises.

4. A single run machine comprising carriers feeding to a delivery section having parallel walls and a hinged door section, a scutching and collecting mechanism, suitable driving mechanism for said scutching and collecting mechanism, means for driving said carriers, means for stopping and starting said carriers through connections to said hinged door section affected by the surplusage fed in to said delivery section and its relief, means for adjusting the speed of the run of the collecting mechanism operated independently of the operation of the stopping and starting mechanism, and means for beating, cleaning and delivering a lap ready for carding.

5. In a scutching or picker machine, a feed carrier suitably driven and having a start and stop mechanism, means for dressing the material fed in, an encased passage having a movable member operated by excess material for stopping the feed, an intermediate feed carrier having speed control members, pedals supported on point bearings and constantly engaged thereabove and having members projecting rearwardly and operating said speed control members, a pair of collecting rolls, a regulating roll having spiral grooves from end to end forming teeth always engaging the stock at practically even pressure over said pedals, a beater dressing the sheet made, suction cages, calender rolls and winding core for the lap.

6. In a scutching or picker machine, a feed carrier suitably driven and having a start and stop mechanism, means for dressing the material fed in, an encased passage having a movable member operated by excess material for stopping the feed, an intermediate feed carrier having speed control members, pedals supported on point bearings and having members projecting rearwardly therefrom and operating said speed control members and constantly engaged thereabove, a pair of collecting rolls, a regulating roll having spiral grooves from end to end forming corrugated teeth always engaging the stock at practically even pressure over said pedals, a beater dressing the sheet made, suction cages, calender rolls and winding core for the lap.

JOHN GREEN KERSHAW.